(12) United States Patent
Robin et al.

(10) Patent No.: US 9,024,803 B2
(45) Date of Patent: May 5, 2015

(54) METHOD FOR DETECTING A MESSAGE SENT BY AN INTERROGATOR OR A TRANSPONDER IN MODE S

(75) Inventors: Dominique Robin, Vezin-le-Coquet (FR); Laurent Belmon, Paris (FR); Claude Provost, Laval (FR)

(73) Assignee: Thales, Courbevoie (FR)

( * ) Notice: Subject to any disclaimer, the term of this patent is extended or adjusted under 35 U.S.C. 154(b) by 685 days.

(21) Appl. No.: 13/375,944

(22) PCT Filed: Apr. 19, 2010

(86) PCT No.: PCT/EP2010/055118
§ 371 (c)(1),
(2), (4) Date: Apr. 19, 2012

(87) PCT Pub. No.: WO2010/139502
PCT Pub. Date: Dec. 9, 2010

(65) Prior Publication Data
US 2012/0280850 A1   Nov. 8, 2012

(30) Foreign Application Priority Data
Jun. 3, 2009 (FR) ...................................... 09 02674

(51) Int. Cl.
*G01S 13/00* (2006.01)
*G01S 13/78* (2006.01)
*G01S 13/76* (2006.01)

(52) U.S. Cl.
CPC ............. *G01S 13/782* (2013.01); *G01S 13/767* (2013.01)

(58) Field of Classification Search
CPC .... G01S 13/765; G01S 13/782; G01S 13/784
USPC .......................................... 342/37, 42, 44, 45
See application file for complete search history.

(56) References Cited

U.S. PATENT DOCUMENTS

| 5,089,822 | A  | * | 2/1992 | Abaunza et al. | ................. | 342/30 |
| 5,471,509 | A  | * | 11/1995 | Wood et al. | ................... | 375/350 |
| 6,768,445 | B1 | * | 7/2004 | Johnson | ........................... | 342/32 |
| 6,819,282 | B1 | * | 11/2004 | Galati et al. | .................... | 342/37 |
| 7,015,856 | B1 | * | 3/2006 | Johnson | ........................... | 342/32 |
| 7,352,318 | B2 | * | 4/2008 | Osman et al. | ................... | 342/37 |
| 7,471,235 | B2 | * | 12/2008 | Ootomo et al. | ................. | 342/37 |
| 2006/0197700 | A1 | * | 9/2006 | Stevens et al. | .................. | 342/37 |

FOREIGN PATENT DOCUMENTS

FR   2632421 A1   12/1989
WO   2005/085898 A1   9/2005

* cited by examiner

*Primary Examiner* — John B Sotomayor
*Assistant Examiner* — Marcus Windrich
(74) *Attorney, Agent, or Firm* — Baker & Hostetler LLP

(57) ABSTRACT

A method for detecting a message provided with a preamble with a number of pulses in a signal sent by an interrogator or a transponder in mode S, said method including a step for decomposition of said signal into an amplitude signal and into a complex phase signal, a step for detection of said preamble by correlating the amplitude signal with a replica signal of the expected pulses, and a phase control step executed by adding together the samples of the phase signal for the duration of the pulses of said preamble and by comparing the sum obtained with a threshold. The method may include a step for time synchronization by correlation of the complex phase signal with a reference sequence formed by one or more known bits before the decoding of the data. The method applies notably to the decoding of interrogation messages borne by low-power signals.

8 Claims, 4 Drawing Sheets

METHOD FOR DETECTING A MESSAGE SENT BY AN INTERROGATOR OR A TRANSPONDER IN MODE S

CROSS-REFERENCE TO RELATED APPLICATIONS

This application is a National Stage of International patent application PCT/EP2010/055118, filed on Apr. 9, 2010, which claims priority to foreign French patent application No. FR 09 02674, filed on Jun. 3, 2009, the disclosures of each of which are incorporated by reference in their entireties.

FIELD OF THE DISCLOSED SUBJECT MATTER

The present invention relates to a method for detecting a message sent by an interrogator or a transponder in mode S. The invention applies notably to the decoding of interrogation messages borne by low-power signals.

BACKGROUND

Airports are usually equipped with secondary radars for interrogating the aircraft moving around in their vicinity. The aircraft process the interrogation messages sent from the ground using onboard transponders. Conventionally, the secondary radars are equipped with directional antennas pointing towards the aircraft to be interrogated, so as to focus the power of the signals carrying the interrogation messages and thus facilitate their onboard processing.

A problem in decoding the interrogation messages arises when the power of the signals sent by the secondary radars is to be reduced or when trying to decode these signals at greater distance than the initially planned distance. For example, it may be desirable to widen the area covered by a radar on the ground without increasing the power of the signals sent; there may also be a desire to send the interrogation messages from the ground with an omnidirectional antenna to an aircraft. The power received by the transponder is then insufficient to be able to decode the messages with the current equipment.

To compensate for the link budget losses between the interrogator and the transponder, it is possible to increase the power of the interrogator. This solution is, however, rarely applicable for reasons of operational constraints and/or installation costs, because it entails significant hardware modifications.

Among the existing interrogation message formats, the mode S is more particularly concerned, because it is a selective interrogation mode widely used in civil aviation. A message in mode S format, represented in FIG. 1, comprises a preamble 101 followed by a phase inversion 103 and data 105 transmitted by differential phase modulation, which modulation will hereinafter be designated by the acronym DPSK, standing for "Differential Phase Shift Keying". The preamble 101 comprises two pulses 111, 112 separated in time by a known duration.

The American patent published under the reference U.S. Pat. No. 5,089,822 presents a method for detecting the preamble of an interrogation message in mode S performing a comparison between an expected pattern of two pulses with a threshold of the received signal. However, the use of this method results in numerous false detections when the signal-to-noise level of the received signal is low. This same patent U.S. Pat. No. 5,089,822 proposes detecting the phase inversion 103. However, this simple phase inversion detection may prove imprecise for a time synchronization used to perform a correct decoding of the data 105.

SUMMARY

One aim of the invention is notably to improve the sensitivity of the transponders with the decoding of the interrogations in mode S without any hardware modification to these transponders. To this end, the subject of the invention is a method for detecting a message provided with a preamble with a number of pulses in a radiofrequency signal sent by an interrogator or a transponder in mode S, said method comprising a step for decomposition of said signal into an amplitude signal and into a complex phase signal, a step for detection of said preamble by correlating the amplitude signal with a replica signal of the expected pulses, and said a phase control step determining whether a trend of the phase of the radiofrequency signal is consistent with that which is expected for a message preamble in mode S by adding together the samples of said phase signal for the duration of the pulses of said preamble and by comparing the sum obtained with a threshold by analyzing the samples, so as to determine whether the phase signal is a sinusoidal signal, for example by comparing the sum obtained with a threshold.

The method according to the invention makes it possible to check the consistency of the phase on the unmodulated pulses of a signal detected after a first detection phase by correlation, in order to check that the phase of this detected signal does indeed have the linear characteristics of a sinusoidal signal, for the 1030 MHz or 1090 MHz IFF systems, and not the random characteristics of a thermal noise present in front of the signal, between the pulses of the signal, and after the pulses of the signal.

The association between the correlation step and the phase control step notably makes it possible to reduce the sending power of the interrogation systems, and therefore reduce the size and energy consumption of the interrogation system, which is particularly useful when such systems are embedded in small-volume platforms with limited resources. The method according to the invention also makes it possible to reduce the number of false preamble detections.

According to one implementation of the method according to the invention, the preamble of the message is followed by a data block coded by differential phase modulation and the method comprises a step for time synchronization by correlation of the complex phase signal with a reference sequence formed by one or more known bits before the decoding of the data.

In practice, if the preamble of a mode S message is detected in a signal whose power level is reduced relative to a conventional signal, by virtue of the method according to the invention, then the time synchronization on this low-level signal must once again be correctly performed thereafter. Thus, the reference sequence is used to improve this synchronization, notably to allow for a successful decoding of the data following the preamble.

The reference sequence may comprise at least one phase inversion bit and five bits identifying the format of the mode S message. Furthermore, the reference sequence may comprise non-consecutive data bits.

According to one embodiment of the method according to the invention, the phase control step checks that the phase of the received signal varies according to a sinusoid by demodulating the complex phase signal into a real component I and an imaginary component Q then by comparing with a threshold the sum of a number of samples taken during the pulses on each of the components I, Q.

According to one embodiment of the method according to the invention, the message is an interrogation message in mode S and the replica signal correlated with the amplitude signal comprises two pulses, each with a duration substantially equal to 0.8 μs, said pulses being spaced apart in time by a duration of 2 μs.

According to one embodiment of the method according to the invention, the message is a reply message in mode S and the replica signal correlated with the amplitude signal comprises four pulses, each with a duration substantially equal to 0.5 μs.

According to one embodiment of the method according to the invention, the phase control step is executed only if a preamble has been observed during the preamble detection step.

According to one embodiment of the method according to the invention, the threshold level for the detection of the preamble is determined according to the noise level of the signal and/or the maximum amplitude of the amplitude signal.

Also the subject of the invention is a transponder comprising at least one antenna and one radiofrequency front-end module, the transponder comprising a processing unit for implementing the method as described above.

BRIEF DESCRIPTION OF THE DRAWINGS

Other features will become apparent from reading the detailed description given as a nonlimiting example and in light of the appended drawings which represent.

In the interests of clarity, the same references in the different figures designate the same elements.

DETAILED DESCRIPTION

Figure 2A:
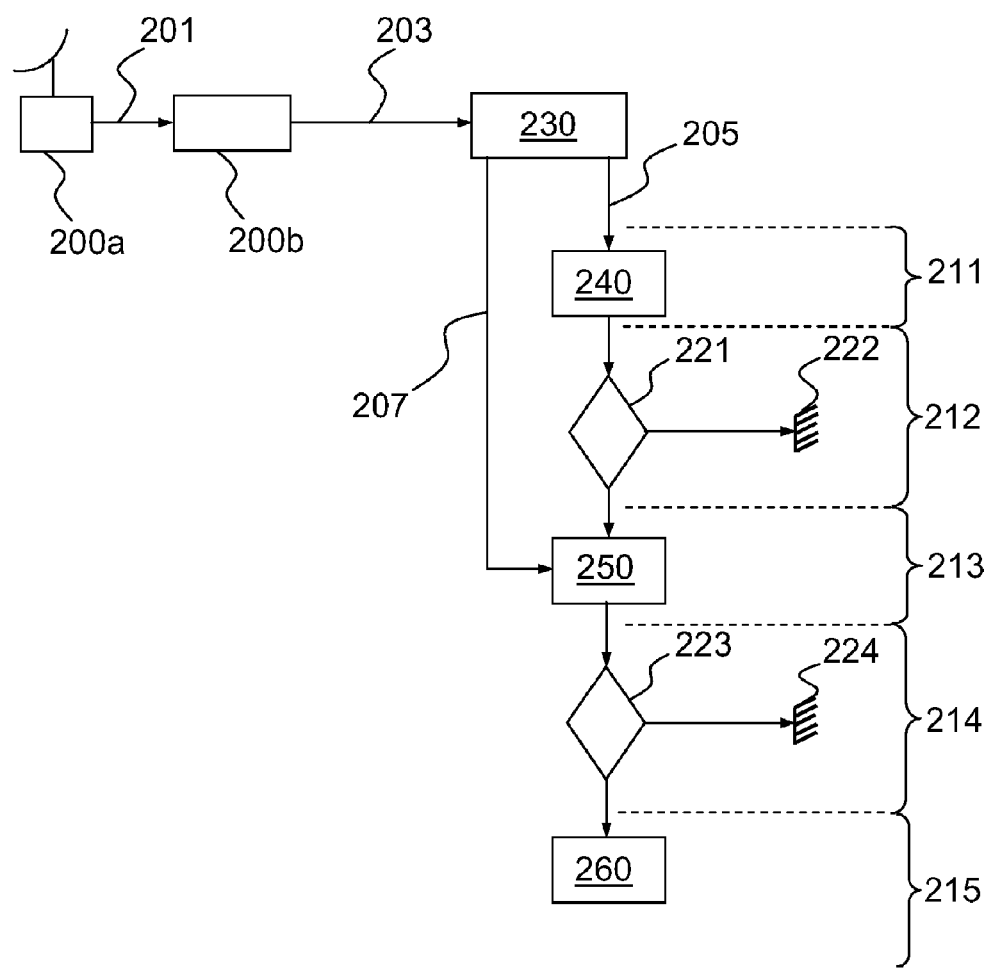
FIG. 2a, a block diagram illustrating the steps of a first method according to the invention.

Reference is now made to FIG. 2a, which represents a block diagram illustrating the steps of a first method according to the invention. The data of a mode S interrogation message carried by a radiofrequency signal 201 received, for example, by the antenna 200a of a transponder, is to be decoded. The radiofrequency signal 201 is brought to intermediate frequency by a front-end module 200b, then the intermediate frequency signal 203 is sampled and decomposed, for example by a logarithmic amplifier 230, into two distinct signals 205, 207, the first of which 205 bearing the amplitude information, the second signal 207 bearing the phase information. The first signal 205 is a numeric amplitude signal that can be expressed on a logarithmic scale, this first signal 205 being designated hereinafter as "video signal" 205, the second signal being a phase signal 207 whose amplitude is unitary, this second signal being designated hereinbelow by the expression "signal in intermediate frequency".

During a first step 211, the video signal 207 is analyzed by a module 240 for detecting the preamble of the mode S message. This first step 211 is detailed later in FIG. 3.

In a second step 212, a test 221 is performed to know whether a preamble has been detected by the detection module 240. If no preamble has been detected, the signal is not processed as an interrogation message in mode S. The method is stopped at 222.

On the other hand, if a preamble has been detected by the detection module 240, a third step 213 for phase control is executed. At this stage, the signal is detected as bearing an interrogation message in mode S, but it is still possible for it to be a false detection. In this third step 213, the signal is analyzed by a phase control module 250 making it possible to determine whether the trend of the phase of the signal is consistent with that expected for a message preamble in mode S. Unlike a conventional method for which a first step for detection of the preamble would result in numerous uncorrected false detections at low power levels, the third step 213 for phase control as executed by the method according to the invention makes it possible to eliminate the false detections generated in the first step 211. The third step 213 is detailed later in FIG. 5.

In a fourth step 214, a second test 223 is executed to determine whether, given the result obtained by the phase control module 250, the preamble detection module 240 has made a false detection. If such is the case, the method is stopped at 224.

Otherwise, that is to say if the second test 223 indicates that the phase control has confirmed the fact that the signal processed was indeed a signal bearing an interrogation message in mode S, then a fifth step 215 for decoding the data of the message is performed by an appropriate module 260.

Figure 1A:
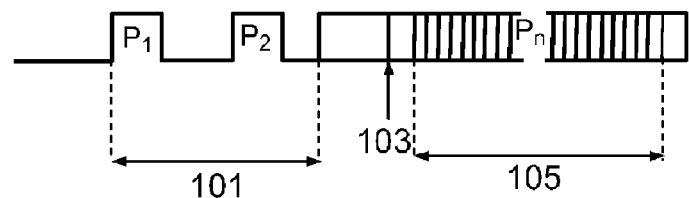
FIG. 1a, a graph representing the appearance of an interrogation message in mode S, this figure having already been described above.
Figure 1B:
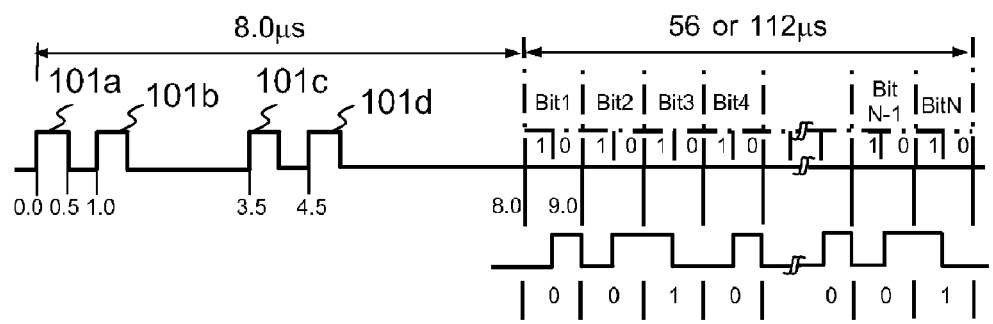
FIG. 1b, a graph representing the appearance of a reply message in mode S.

The method according to the invention can be adapted to the detection of the preamble of a reply message in mode S, this type of message comprising four pulses 101a, 101b, 101c, 101d, as illustrated in FIG. 1b. Without departing from the framework of the invention, the method is applicable to messages comprising a different number of pulses.

Figure 2B:
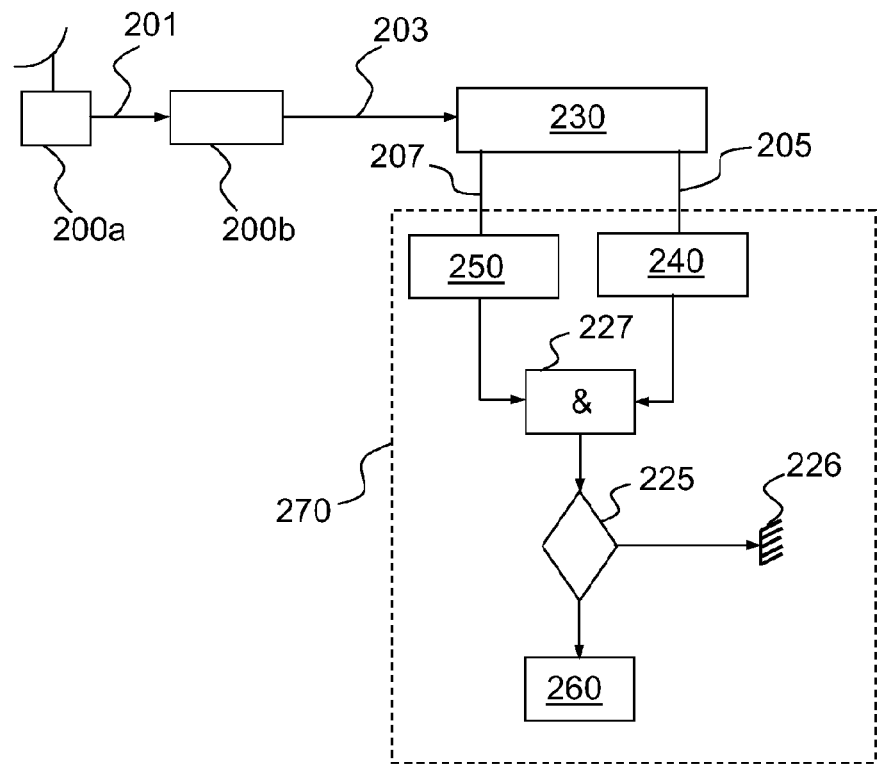
FIG. 2b, a block diagram illustrating the steps of a second method according to the invention.

FIG. 2b presents a block diagram illustrating the steps of a second method according to the invention. According to the implementation presented in this figure, the detection of the preamble 240 and the phase control 250 are executed in parallel. The result of the detection 240 and of the phase control 250 are combined 227 and tested 225. This test 225 causes the method to be stopped at 226 if the detection of the preamble 240 and/or the phase control 250 does not indicate the observation of a preamble. Otherwise, the decoding of the data of the message is performed by an appropriate module 260. The steps of the method according to the invention can be executed by a processing unit 270, for example a programmable circuit or a microprocessor executing a software module.

Figure 3:
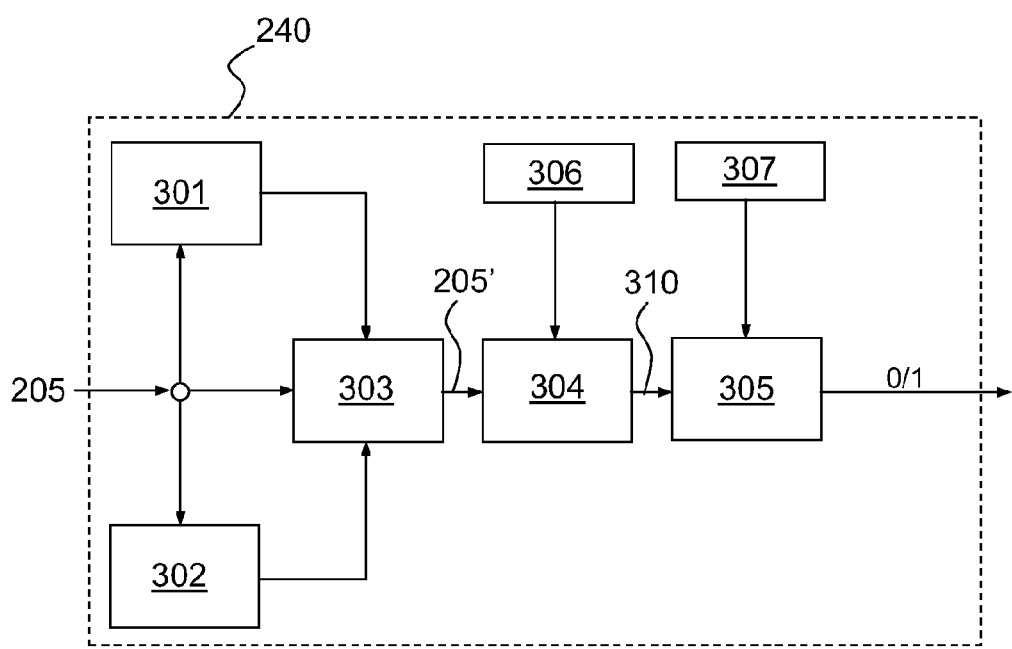
FIG. 3, a block diagram illustrating steps executed by the method according to the invention to detect the preamble of an interrogation message in mode S.

FIG. 3 illustrates, through a block diagram, steps executed by the method according to the invention to detect the preamble of an interrogation message in mode S.

The video signal 205 is transmitted to a module 301 for estimating the noise level and to a module 302 for estimating the maximum amplitude of the video signal 205. The video signal 205 is then processed by a normalization module 303, the normalization factor applied to the video signal 205 being chosen according to the estimated noise level and the maximum amplitude of the video signal. One aim of this normalization is to express the video signal over a constant dynamic range.

The normalized video signal 205' is then transmitted to a correlator 304 receiving as input a pattern 306 to be correlated with the normalized signal 205'. This pattern for the mode S takes the form, for example, of two square pulses with a duration of 0.8 µs separated by a duration of 2 µs. The correlation spike 310 is then compared 305 with a fixed threshold 307. If the result of this comparison indicates that the correlation spike 310 is below the threshold 307, then the video signal 205 is considered not to contain the preamble sought. According to another implementation of the method according to the invention, the signal is not normalized and the threshold level 307 is set according to the estimated noise levels and/or the maximum amplitude of the video signal 205.

Figure 4:
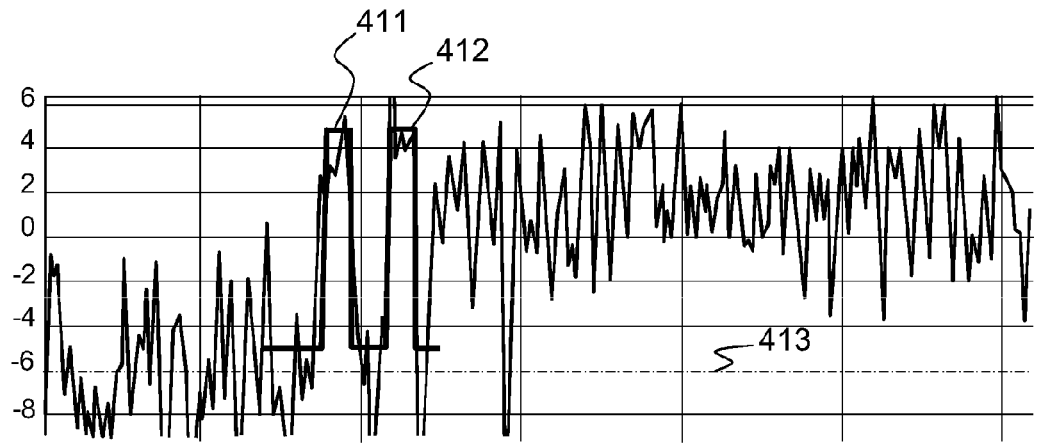
FIG. 4, a graph illustrating a first step of detection of the preamble by the method according to the invention.

FIG. 4 illustrates, by a graph, the detection of the preamble by the abovementioned steps. The pulses 411, 412 detected by the method according to the invention and the estimated average noise level 413 are represented in FIG. 4.

Sequentially or in parallel with the processing of the video signal 205, the phase signal 207 from the amplitude/phase decomposition is controlled.

Figure 5:
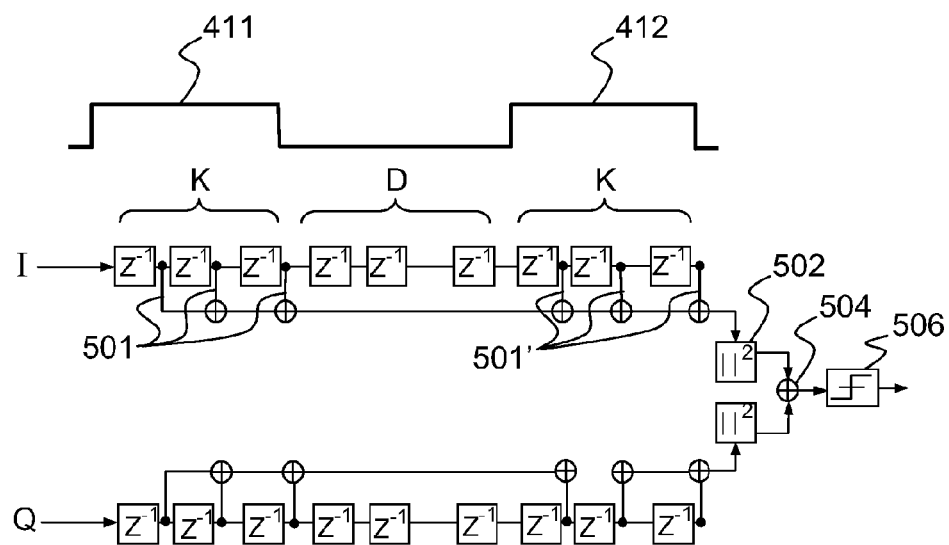
FIG. 5, a block diagram illustrating the steps performed to check the phase of the signal in the detection of the preamble.

FIG. 5 illustrates, through a block diagram, the steps carried out to control the phase of the signal. In the example where the preamble of a mode S interrogation message is being sought, the phase control steps make it possible to check that the radiofrequency signal 201 received (FIG. 2a) is, at the level of the pulses 411, 412 of the preamble, a sinusoid with a frequency of 1030 MHz with a deviation of ±10 kHz. The frequency of the phase signal 207 at intermediate frequency is, for example, of the order of 60 MHz. It is demodulated into two baseband components: the component I for the real part of the phase signal and the component Q for the imaginary part.

A number of samples taken from the component I are added together during the first pulse 411 and during the second pulse 412 of the preamble previously detected (see FIGS. 3 and 4). In the example, K samples 501 are taken during the first pulse 411 and K samples 501' are again taken during the second pulse 412. The first K samples corresponding to the first pulse 411 are added together with the K samples corresponding to the second pulse then this sum $S_I$ of 2K samples is normalized 502. If the phase of the signal had to be represented on a trigonometrical circle, the samples would be taken substantially at the same place on this circle, in the example. The symbols "$Z^{-1}$" in the figure represent the delays equal to the sampling period. As an example, the sampling frequency may be equal to 20 MHz. Any other sampling frequency can be chosen, provided that it is possible to recognize, from these samples, the characteristics of a phase signal with a trend that follows the expected sinusoid, in other words, distinguish a thermal noise from an unmodulated pure sinusoidal signal.

A similar processing is performed for the component Q, so as to obtain the sum $S_Q$ of 2K samples taken from the component Q during the two pulses 411, 412.

The sums $S_I$, $S_Q$ are then normalized and added together 504, and the result $C_\varphi$ of this addition 504 is then compared 506 with a threshold determined on the basis, for example, of D samples taken outside the pulses 411. The value $C_q$, may, for example, be expressed as follows:

$$C_\varphi(n) = \frac{1}{K^2} \left\{ \left| \sum_{j=0}^{K-1} I(n-j) + \sum_{j=0}^{K-1} I(n-K-D-j) \right|^2 + \left| \sum_{j=0}^{K-1} Q(n-j) + \sum_{j=0}^{K-1} Q(n-K-D-j) \right|^2 \right\}$$

in which I(t) designates a sample of the component I at the instant t, Q(t) designating a sample of the component Q at the instant t.

If, following the phase control 250, it is found that a mode S message preamble has indeed been detected, then the data decoding phase (fifth step 215 in FIGS. 2a and 2b) can begin. The data are transmitted in the form of a long pulse denoted P6 and DPSK modulated. The start of this long pulse P6 is marked by a synchronization phase inversion, then the data elements (the bits) are transmitted in succession, each of these bits, in the example, having a duration of 0.25 µs. The "1" data bits are indicated by a phase inversion whereas the "0" data bits are marked by a holding of the phase of the signal.

Unlike a conventional method in which the synchronization phase inversion is detected in isolation, the method according to the invention makes it possible to increase the reliability of and make more accurate the location of the data block in the signal by correlating a long reference sequence with the complex frequency signal (I,Q). More specifically, a mode S message comprises at the start a field identifying the format used for the communication. For the interrogation messages, this data field is qualified by "UF", standing for "Uplink Format", and is coded on 5 bits. Now, the format used for the interrogation is known in advance, which makes it possible to correlate a reference signal comprising at least the synchronization phase inversion and the bits of the UF field. The search for a longer reference sequence in the signal makes it possible notably to locate in the signal the start of the data pulse P6 with greater accuracy. Furthermore, if other data bits are known, then these can be included in the correlation sequence, so as to extend the sequence and consequently further increase the reliability of the method. The bits of the correlation sequence are not necessarily all consecutive. The correlation criterion $C^K$ may, for example, be expressed as follows:

$$C^K(n) = \max_K \left\{ \frac{\sum_{i=0}^{L-1} x(K(n-i)) * d(i)}{\left( \sum_{i=0}^{L-1} |x(K(n-i))|^2 * \sum_{i=0}^{L-1} |d(i)|^2 \right)^{1/2}} \right\}$$

in which x(n) represents a sample of the signal, d(n) representing a sample of the correlation sequence and L the length of the correlation sequence. Finally, the level of the correlation spike obtained at the end of this correlation step with a reference sequence may also constitute an index of reliability of the detection of the mode S message.

The method according to the invention may be implemented in a programmable component, for example an FPGA, "Field-Programmable Gate Array". Advantageously, an FPGA already present in a transponder may be reprogrammed to execute the steps of the method according to the invention, so that no hardware modification then needs to be made to implement the invention. The method according to the invention can be implemented in a system that is already in place without modifying the analog reception subsystems already present in this system, and therefore without altering their noise factor.

The method according to the invention makes it possible to obtain, for a detection made at equivalent distance, a power saving of the order of 6 dB compared to the power obtained with the conventional methods. In other words, given equivalent power, the method according to the invention makes it possible to decode messages at a maximum distance that is approximately twice that obtained with the conventional methods.

The method according to the invention can notably be implemented in terminals onboard an aircraft, to be able to interrogate (in reverse mode) the terminals on the ground from this aircraft. In this case, an omnidirectional antenna is used in sending mode by the terminals on the ground and another omnidirectional antenna is used in reception mode from the aircraft, which means, at the level of the receiving terminals, there is a risk of receiving low power signals affecting the link budget. By virtue of the method according to the invention, the terminals can, despite these low received powers, decode the interrogation messages carried by said signals. The method according to the invention can, for example, be implemented in IFF, "Identification Friend or Foe", transponders.

One advantage of the method according to the invention is that it can be implemented without modifying the hardware architecture of the interrogators and transponders, when the latter are designed on the basis of programmable components or software modules.

The invention claimed is:

1. A method for detecting a message provided with a preamble with a number of pulses in a radiofrequency signal sent by an interrogator or a transponder in mode S and received at an antenna, said method comprising:
   a step for decomposition, at a logarithmic amplifier coupled to the antenna, of said radiofrequency signal including the message with the preamble into an amplitude signal and into a complex phase signal;
   a step for detection, at a processing unit coupled to the logarithmic amplifier, of said preamble by correlating the amplitude signal with a replica signal of expected pulses; and
   a phase control step, performed at the processing unit, determining whether a trend of a phase of the radiofrequency signal is consistent with that which is expected for the preamble in the mode S by adding together samples of said phase signal for a duration of the pulses of said preamble and by analyzing the samples, to determine whether the phase signal is a sinusoidal signal, wherein the phase control step checks that the phase of the received radiofrequency signal varies according to a sinusoid by demodulating the complex phase signal into a real component I and an imaginary component Q then by comparing with a threshold the sum of a number of samples taken during the pulses on each of the components I, Q.

2. The method according to claim 1, further comprising:
   a step of time synchronization by correlation of the complex phase signal with a reference sequence formed by one or more known bits before the decoding of the data, wherein
   the preamble of the message is followed by a data block coded by differential phase modulation.

3. The method according to claim 2, wherein the reference sequence comprises at least one phase inversion bit and five bits identifying the format of the mode S message.

4. The method according to claim 2, wherein the reference sequence comprises non-consecutive data bits.

5. The method according to claim 1, wherein
   the message is an interrogation message in mode S; and
   the replica signal correlated with the amplitude signal comprises two pulses, each with a duration equal to 0.8 μs, said pulses being spaced apart in time by a duration of 2 μs.

6. The method according to claim 1, wherein
   the message is a reply message in mode S; and
   the replica signal correlated with the amplitude signal comprises four pulses, each with a duration equal to 0.5 μs.

7. The method according to claim 1, wherein the phase control step is executed only if the preamble has been observed in the preamble detection step.

8. The method according to claim 1, wherein a threshold level for the detection of the preamble is determined according to a noise level of the signal and/or a maximum amplitude of the amplitude signal.

* * * * *